Oct. 12, 1965  C. E. RICKARD  3,211,472
COUPLING SEAL
Filed Aug. 30, 1963

INVENTOR.
Clyde E. Rickard
BY Green, McCallister & Miller

HIS ATTORNEYS

United States Patent Office 3,211,472
Patented Oct. 12, 1965

3,211,472
COUPLING SEAL
Clyde E. Rickard, Pittsburgh, Pa., assignor to McDowell Manufacturing Company, Du Bois, Pa., a corporation of Pennsylvania
Filed Aug. 30, 1963, Ser. No. 305,766
5 Claims. (Cl. 285—112)

This invention relates to an improved sealing construction for a quickly assembled, collar-operated type of pipeline coupling or joint and particularly, to a positive, leakproof seal that is effective over a wide range of pressures and that is particularly suitable for use in a pipeline carrying gas under pressure or under a variable pressure head.

Previous to my invention, it has been customary to provide a collar-operated type of coupling with a sealing gasket, such as of a U-shaped type, and which thus has a pressure-sensitive chamber whose effective sealing action is dependent upon or is somewhat proportional to the pressure of the liquid or fluid being carried. Such a type of gasket arrangement has been satisfactory, particularly for pipeline systems carrying liquids under pressure and wherein the line pressure applied may reach a positive value in the neighborhood of 200 to 300 p.s.i In a system of this type when used for conducting liquids, such as water and oil, only occasional slight leakage may occur, as during the bringing of line pressure up to its operating value or if a quantity of dirt or other extraneous material collects between the gasket and the joint members that are to be sealed.

However, serious leakage difficulties have been encountered in the transportation of gaseous fluids or vapors, such as natural gas. In this case, leakage is not only a problem from the standpoint of a loss of line pressure and of valuable hydrocarbons, but also from the standpoint of danger of fire or an explosion. The problem has been complicated by the fact that gas pressures may, in overland pipelines, vary from a negative, up to a relatively low positive value of approximately 100 p.s.i., and up to a relatively high positive value of a maximum of about 1000 to 3500 p.s.i. It is thus apparent that the gasket seal must not only be effective from the standpoint of the gaseous nature of the product, itself, but also from the standpoint of the use of negative to relatively high positive pressures. A coupling, fitting or joint suitable for ordinary liquids, such as water, oil, etc., will not meet such requirements, particularly in a coupling of a type such as here involved, or one that may be termed a quick-release type that utilizes a locking collar, and that may be constructed to enable an angular assembly and disassembly of a pair of pipe members, sections or conduits.

The present invention deals particularly with the problem of providing an improved type of sealing-off joint construction for a quickly-assembled latching collar coupling that will be positive in its sealing action under all conditions of operation, irrespectively of the nature of the material being conducted, of variations in line pressure, and of whether the line pressure applied is negative or is at a minimum, a maximum, or some intermediate positive value.

It has thus been an object of my invention to solve the problem above outlined;

Another object has been to discover the factors involved in the problem and find a practical solution thereto;

A further object of my invention has been to devise and provide a practical collar type of pipe joint or coupling which will assure a positive seal under various operating conditions encountered and particularly, from the stringent standpoint of the utilization of a gaseous material, such as a fuel or natural gas;

A still further object of my invention has been to provide a coupling construction that will flexibly adapt itself to various conditions of usage in such a manner as to, at all times, provide an effective sealing action between pipe members, conduits or sections that are being joined, and which is further of a type that will permit quick and easy assembly of the coupling in the field;

These and other objects of my invention will appear to those skilled in the art from the illustrated embodiments of the drawings, the description thereof, as well as the claims.

In the drawings, FIGURE 1 is a longitudinal side view in elevation and broken out section showing a coupling construction of my invention in a preliminary or initially assembled relationship. As will be noted, the coupling shown is of a type that permits an angular assembly of the ends of a pair of pipe sections in a manner illustrated in FIGURE 6 of my patent No. 2,916,306;

Figures 3, 4:
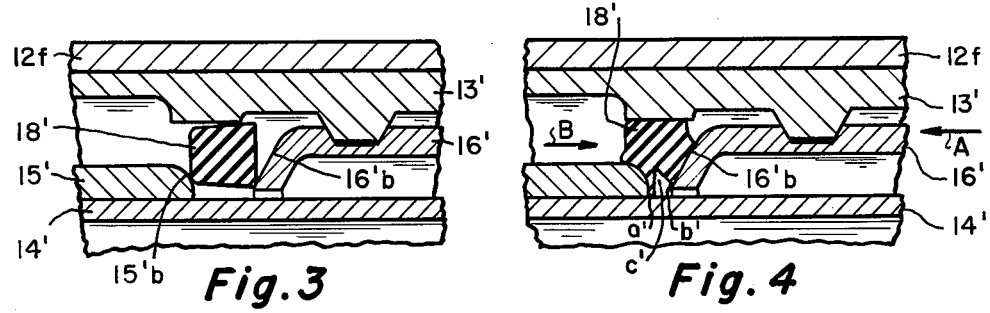
FIGURE 3 is a fragmental side section in elevation on the enlarged scale of FIGURE 2 showing a slightly modified embodiment of my invention, utilizing the principles thereof, and with the coupling parts in an initial assembled relationship, such as also represented by FIGURE 1.
FIGURE 4 is a fragmental sectional view on the same scale of and of the construction of FIGURE 3, showing it in its final, fully positively assembled, locked and sealed-off relationship.
Figure 5:
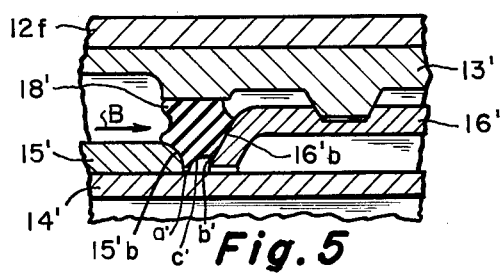

And, FIGURE 5 is a view similar to and of the construction of FIGURE 4, but illustrating the shape of the gasket as distorted by an extremely high positive fluid pressure, whereby a pressure chamber is formed in its forward side face.

In carrying out the illustrated embodiments of my invention, I employ a pair of telescopic coupling parts or members that are carried by adjacent end portions of the pipe or conduit members to be joined, and that cooperate with each other and are adapted to be assembled and positively mechanically latched together by the use of a sleeve assembly member or coupling collar part. Relatively flat-crested cooperating threads are employed for quick and easy assembly and disassembly. I also may provide a forwardly-positioned conventional sealing gasket in a conventionally positioned and mounted relationship within a pocket or recess between the telescopic coupling parts for effecting a pressure-sensitive sealing action that is substantially proportional to the positive pressure of the fluid in the line. Such a gasket, provides a good supplement with a main gasket for effecting fluid sealing-off action, particularly for intermediate positive pressure applications.

In accordance with my present invention, however, I essentially provide an intermediate or back-positioned, annular pocket or recess between cooperating telescopic parts which receives a resilient sealing gasket having a solid elastic body of substantially rectangular section, and which has opposed side abutment faces that cooperate with the gasket in a localized manner along one of its radial heel areas, such as along the inner radial area of its inner heel portion. The gasket is distorted or elastically-flowed into a desired elastic or resilient shape that provides an elastic or resilient release area and an elastic release action to enable pressure fluid to effectively inwardly-distort and form a V or U-shaped chamber in a forward side face portion of its body under higher pressures. Such gasket is positively maintained under a maximized but elastic tightened-down sealing surface abutment with adjacent surfaces of parts or members defining the joint, in such a manner that it is fully effective under negative as well as minor pressures up to and through maximum positive pressures which produce a side distortion of the gasket and a proportionate increase of its sealing action.

Summarized briefly, I have discovered that a seal, to be positive under all the conditions above outlined, has to employ a resilient or elastic gasket that is relatively incompressible, in the sense of being resilient, and in such a manner as to distort or flow the gasket radially by a localized pressure applied along opposed sides of at least one of its peripheral inner and outer heel portions or annular peripheral areas, while also providing sealing surface areas of the gasket with a tight sealing engagement with adjacent surface areas of the members of the joint and with the body of the gasket retained in an elastic condition. Such a gasket should have a side that is open or exposed to the pressure fluid and that is positioned in such a manner that it will be capable of inward, chamber-forming distortion or flexing under higher pressures of the fluid, without destroying its sealing-off action, and to, in fact, increase it in proportion to the pressure force effecting the distortion. I have determined that the gasket, in its initial sealed positioning, must not be held or confined in such a manner in its pocket that it acts as a hard solid and that it cannot react resiliently or elastically to pressure variations in the fluid being carried by the pipeline. At the same time, it must be positioned in a radially distorted manner by mechanically applied holding force to, at all times, maintain an efficient elastic seal with adjacent surfaces of the joint members, and particularly when a negative to a fairly high positive fluid pressure is being applied.

I have been able to meet the above factors and devise a highly improved and fully effective type of coupling seal by providing opposed edge, shoulder or face portions of parts or members which, under the action of a coupling collar, will press-in and distort opposed localized side area of a heel or peripheral area of the gasket into a substantially U or V-shape and, at the same time, due to the flowable substantially incompressible characteristics of the gasket, cause its one peripheral or heel area and its opposed clamped peripheral or heel area to tightly elastically seal-engage with adjacent members of the coupling and retain such engagement under the clamping action of the coupling in its fully latched or final assembled relationship. By localizing the application of gripping or distorting pressure on the gasket, I provide a maximized sealing engagement of it with the coupling members and, at the same time, retain its elastic or resilient characteristics, such that it will be sensitive to fluid pressure action to increase its sealing action when the pressure of the fluid goes into a higher value, for example, above about 200 to 300 pounds per square inch. Also, by positioning the gasket in such a manner that the V-chamber produced by mechanically distorting it into a sealing position is open to the atmosphere, I make possible a proportionate sealing action under negative pressure applications.

This arrangement avoids a condition such as would result if the gasket was positioned in a substantially fully enclosed pocket and mechanical clamping or sealing pressure was applied by the coupling or latching member, without permitting elastic distortion of the gasket. Under such a condition, I have found that the gasket will become a hard body of no effective resiliency or elasticity and that its sealing action will have only one value, such that it is ineffective for conditions above outlined. I have discovered that a peculiar effect is obtained by applying opposed side forces to opposite sides of the gasket in a localized area adjacent one of its heel portions which, as illustrated in the drawings, involves a radial attenuation or extension of opposed edges, and the elastic distortion formation of a substantially V-shaped pocket or chamber that is open to the radial heel of the gasket. This is highly advantageous, in that it provides a relief and a negative pressure utilizing area which functions, as above indicated. It, at the same time, effects a radial inner and outer elastic flow distortion of the gasket into positive sealing engagement with adjacent surface portions of the coupling joint.

Figure 1:
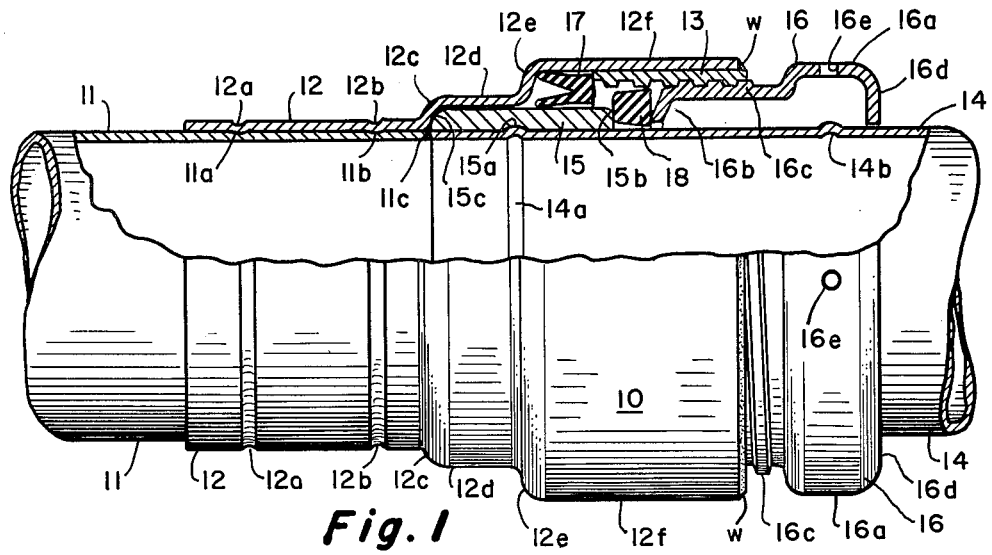
Figure 2:
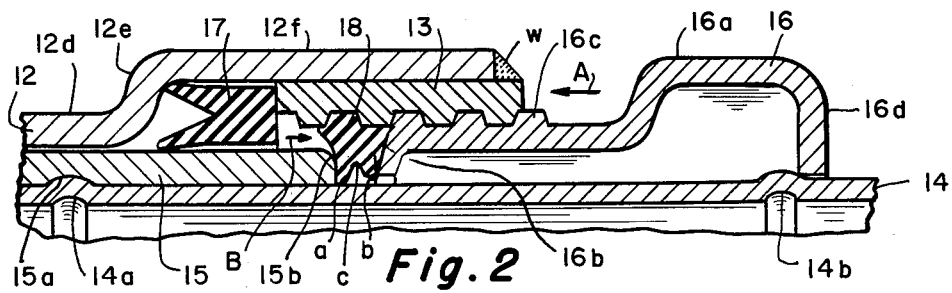
FIGURE 2 is an enlarged fragmental side section of the construction of FIGURE 1, showing it in a final assembled, sealed-off and locked relationship.

Referring particularly to FIGURES 1 and 2 of the drawings, the coupling assembly 10 of my invention is adapted to connect adjacent ends of a pair of pipe members, conduits or pipe sections 11 and 14. A socket-defining, forwardly-extending housing body 12 is shown secured on the end portion of the pipe member 11 in a suitable manner, as by rolled-in or inwardly offset joints 11a–12a and 11b–12b. The socket may also be provided by expansion-forming the end portion of the pipe section 11. The housing body 12 extends forwardly from the pipe member 11 and has a first shoulder 12c which serves as an abutment shoulder and is connected by an intermediate cylindrical portion 12d to a second radially-outwardly-projecting, outer shoulder 12e. The shoulder 12e serves with a main socket portion of maximum diameter and of cylindrical shape 12f to define a pocket or operating recess for an annular sealing gasket 17. A reinforcing or internal sleeve part or portion 13 of the socket which has a tight frictional fit within the main socket portion 12f along its inner wall, terminates in a spaced relation with respect to the outer shoulder 12e to further define the pocket or receiving recess for annular gasket 17. The sleeve part 13 is shown integrally secured to the portion 12f by weld metal w; it is shown internally threaded with relatively coarse or flat-crested, widely-spaced, female threads to cooperate with complementary male threads of a sleeve assembly member or latching collar part 16.

The other or opposed pipe member 14 carries a reinforcing nose part or sleeve 15 in a tight frictional fit about the outer periphery of its end portion and is suitably secured thereon, as by outwardly-offset, rolled-out portions 14a, 15a to make it integral with the end of the pipe member 14. It will be noted that the forward edge of the pipe member 14 cooperates with a rounded or upwardly-beveled, forward edge 15c of the nose part 15 to provide a stop limit abutment or shoulder that cooperates with a forward edge 11c of the pipe member 11 and with inner shoulder 12c to limit the maximum slidable telescopic insertion of the pipe member 14 and its nose part 15 within the socket-defining body 12 of the member 11.

The nose part 15, as shown particularly in FIGURE 1, is of cylindrical shape and its outer periphery slidably fits within and cooperates with the intermediate cylindrical portion 12d of the socket body 12 to align the members 11 and 14 with respect to each other. Also, the outer surface of the nose part 15 cooperates with the shoulder 12e, a back end of the cylindrical portion 12f, and the forward edge of the sleeve part 13 to define the receiving or positioning socket, pocket or recess for annular gasket 17. The nose part 15 has a back edge, face or shoulder 15b that cooperates with an adjacent portion of the pipe member 14 and adjacent inner peripheral portion of the sleeve member 13, as well as with an opposed radially-inturned rounded edge, face, flange or shoulder portion 16b of the coupling collar member 16 to define an annular recess or pocket for an annular second or main sealing gasket 18.

The coupling collar part or sleeve member 16 has a radially-outwardly-projecting, enlarged back, cylindrical portion 16a which serves as a grip portion for screwing and unscrewing the member into and out of a locking position. As shown in FIGURE 1, the portion 16a may be provided with one or more holes 16e therein for receiving a pin-like tool that may be used for providing a final tightening-down action and an initial loosening action as to the collar part 16. The collar part 16 also has a substantially cylindrical, forwardly-extending portion 16c of an inwardly-offset diameter with respect to the portion 16a. The portion 16c has outer or male threads of a relatively widely spaced, flat-crested type corresponding to the female threads of the portion 13 of the socket 12 to cooperate and interfit therewith. The forward end of the portion 16c terminates in an inwardly-inclined annular flange 16b which serves as an abutment edge, shoulder or face for one side of the gasket 18.

It will be noted that the pipe member 14b is shown provided with an outwardly-projecting, rolled-out, annular shoulder 14b for limiting the maximum turning-in or tightening-down of the collar 16 by engagement with a radially-inwardly-turned, back flange portion 16d of the coupling collar member (see FIGURE 2). Spaced dimples or a separate projecting rim may be provided instead of the portion 14b, but the primary function is to act as a stop means to limit the distortion of the gasket 18 to that illustrated in FIGURE 2 of the drawings, so that the gasket has a fully effective elastic sealing action in its distorted or flowed relationship.

The gaskets 17 and 18 may be of a suitable rubber-like resin material which has a good elastic and compression strength and which is resistent to the particular type of fluid that is being carried. For example, for hydrocarbon products, it may be made of a resin in the nature of neoprene, a chloropene rubber sold by Dupont or a Buna N rubber, such as developed by I. G. Farbenindustrie of Germany and which is a co-polymerization product of butadiene and acrylonitrile. The heel portion of the gasket 17 is engaged by the forward edge face of the sleeve 13 to hold it in position. The gasket 17 is provided with a U or V-shaped, pressure-sensitive chamber that is open in the direction of the joint and thus, to the fluid which is being carried by the joint.

The gasket 18 is shown as of substantially square or rectangular section and as positioned with its inner heel portion in an opposed relation (slightly spaced or abutting) relation with and about the outer surface of the pipe member 14 (see FIGURE 1) and its outer heel portion in an opposed or engaging position within the sleeve part 13. It is held in its pocket along a localized area of its side faces between opposed abutment faces, edges or shoulders 15b and 16b which, when the coupling member 16 is tightened-down (see arrow A), distort the gasket 18 in a manner shown particularly in FIGURE 2. This distortion, in effect, radially-elongates the gasket 18 and, of particular importance, causes the opposed edges of its heel portion between the abutment faces 15b and 16b to be distorted into a substantially V or U shape, thus defining side wings a and b and a V-shaped, flow relief chamber c.

When a high fluid pressure is applied, as indicated by the direction of the arrow B of FIGURE 2, the gasket 18 is adapted to distort in a manner shown by FIGURE 5 and to cause the wings a and b (or a' and b') to move toward each other, taking up at least some of the relief spacing provided by the chamber c (or c'). In this connection, it will be noted that the gasket 18 is exposed or open to the coupling joint along its one side to fluid which bypasses or may leak past the gasket 17 (if it is used), so that it, like the gasket 17, is sensitive to fluid pressure in its sealing action, but unlike the gasket 17, has a full, positive, sealing action under negative, minor, intermediate and extremely high positive fluid pressures. The full annular, complementary or latching positioning (thread tooth and root) of the outer periphery of the gasket 18, such as shown in FIGURE 2, is particularly suitable where extremely high negative pressures are encountered, although the embodiment of FIGURE 4 is suitable where a moderate range of negative pressure is encountered, as for example occasioned by reversals of positive line pressure. It will be noted that in both embodiments, the outer peripheral heel portion of the gasket 18 or 18' is held in tight frictional compression abutment and secure engagement with an inner peripheral wall portion of the socket 13 by the compressive-force clamping action of the opposed end face portions 15b and 16b or 15'b and 16'b on abutting front and back portions of the gasket adjacent its inner periphery or heel portion.

Referring particularly to FIGURES 3, 4 and 5 of the drawings, I have shown a slightly modified construction to which I have applied the same numerals for similar parts, but with prime suffixes. In this construction, the cooperating teeth and recesses of the threads of the parts 13' and 16' have a relation such that one of the teeth of the sleeve part 13' aligns with the outer or upper heel portion of the gasket 18' when the collar 16' is in its maximum tightened-down position. Also, the abutment face or edge 15'b of the nose part 15' is inwardly-downwardly beveled, and the abutment face or flange 16'b of the coupling part 16' has an increased slope, as compared to the slope of 16b of FIGURE 1. FIGURE 3 illustrates the relationship of the parts in the initial assembled position corresponding to FIGURE 1, while FIGURE 4 illustrates the relationship of the parts after the collar part 16' has been fully tightened-down and the gasket 18' has been distorted. It will be noted that the wing portions a' and b' like the wing portions a and b of the embodiment of FIGURE 2, have a tight sealing engagement with the opposed faces of the portions 15'b and 16'b and that a V-shaped relief chamber c' is formed therebetween. In FIGURE 5 I have illustrated the effect of the application of a relatively high positive pressure in the neighborhood of about 700 to 800 pounds per square inch.

The embodiments of FIGURES 2 and 4 illustrate the adaptability of the construction of my invention. As previously indicated, a pair of opposed edge faces are adapted to, in effect, squeeze the gasket along a localized side of one of its heel portions or along restricted annular areas of the socket within which it is positioned. It will be noted as to the embodiment of FIGURES 3 to 5, that the gasket 18' is annular and that the threading of the sleeve part 13' is spiral and thus, that the gasket will interlatch between the root and tooth of at least a portion of the threading when it is in its tightened-down operating position. In my construction, the opposed front and back end faces 16b–15b and 16'b and 15'b, as emphasized in the embodiment of FIGURES 3 to 5, inclusive, slope or incline towards each other in a radial-inward direction to provide the desired wedging or clamping action on the gasket 18 or 18' that results in the forming of the recess c when the coupling is fully tightened-down.

Although I have shown exemplary constructions of my invention, it will be apparent to those skilled in the art that the principles thereof can be embodied in other structures, and that the gasket 18 or 18' can be utilized, either in combination with another gasket, or independently, in accomplishing an effective positive sealing action.

What I claim is:

1. In a quickly-assembled latching collar coupling of the character described that connects a pair of fluid-carrying pipe members at their adjacent ends, wherein an internally-threaded radially-enlarged socket part projects forwardly from the end of one of the pipe members, a nose part projects forwardly on the end of the other pipe member to fit in a telescopic relation within the socket part of the one pipe member and define at its front end portion a slide joint with the socket part, the socket part has an inner peripheral wall portion that is radially-outwardly-offset with respect to the nose part to define an operating spacing therebetween, an externally-threaded coupling collar is adapted to cooperate with the internally-threaded socket part for turning in and out movement therewith in a spaced relation about the other pipe member, and the pipe members having cooperating means for limiting the maximum inward positioning of the nose part within the socket part, an improved positive fluid sealing-off joint construction which comprises, stop means cooperating with the coupling collar for limiting the maximum inward turning movement of the coupling collar within the socket part to a longitudinally-spaced back position with respect to the back end portion of the nose part, the coupling collar having a radially-inwardly projecting front end face cooperating in an endwise-opposed relation with a back end face of the nose part and cooperating with the inner peripheral wall portion of the socket part and an outer peripheral wall portion of the other pipe member to define an annular gasket-receiving recess that is open on one side to the operating spacing and the slide joint between the nose and socket parts and radially-outwardly of the nose part, said front and back end faces slopping radially-inwardly towards each other, a resilient annular sealing gasket having a body of solid cross-section provided with radial inner and outer peripheral heel portions, said radial inner peripheral heel portion having a diameter that is larger than the diameter of the outer peripheral wall portion of the other pipe member; said sealing gasket being carried in said recess with its body in an undistorted position, with localized opposed front and back side areas adjacent its inner peripheral heel portion positioned between said front and back end faces, and with its radial inner heel portion in a relatively loose relation with the outer peripheral wall portion of the other pipe member when the coupling collar is in an initial turned-in relation within the socket part; said sealing gasket being constructed to be elastically-radially-distorted by compression force exerted on its said opposed front and back side areas by and between said front and back end faces into tight sealing and mechanically-secure engagement with an inner peripheral wall portion of the socket part at the recess, and with its front side exposed radially beyond said back end face of the nose part to the operating spacing when the coupling collar is turned-in within the socket part to a maximum position as limited by said stop means, and said sealing gasket in its tight sealing engagement defining an elastic relief area in its inner peripheral heel portion for negative and positive fluid pressure applied to its exposed front side through the operating spacing.

2. A quickly assembled latching collar coupling as defined in claim 1 wherein, the outer peripheral heel portion of said gasket has a complementary latching engagement with the threads of the socket part when the coupling collar is in its maximum turned-in position within the socket part, the back end face of the nose part projects radially-outwardly from the other pipe member to cooperate with the radially-inwardly projecting front face of the coupling collar, said relief area is defined by an atmospheric pressure-sensitive shaped body portion of said sealing gasket that is shaped by turning-in the coupling collar within the socket part to its maximum position, and said shaped body portion is open adjacent the other pipe member to the atmosphere, whereby said shaped body portion will provide said gasket with an effective sealing action when fluid is being carried under negative pressure by the pipe members and is being applied to said sealing gasket through the operating spacing between the nose and socket parts.

3. In a quickly assembled latching collar coupling as defined in claim 1 wherein, said annular sealing gasket is of substantially rectangular section when the coupling collar is initially turned-in with relation to the socket part; and said gasket is distorted between said front and back end faces into a V-shape at its inner peripheral heel portion that is open towards the outer peripheral wall portion of the other pipe member when the coupling collar is turned-in to its maximum position, and is elastically-retained in said recess with its front side portion extending radially-outwardly of the nose part and exposed to the operating spacing of the recess, whereby said V-shaped portion will provide a relief area for the body of said sealing gasket when sufficient positive fluid pressure force is exerted on the exposed front side portion thereof to elastically-distort it inwardly.

4. In a quickly-assembled latching collar coupling as defined in claim 1 wherein, a second resilient annular sealing gasket is operatively positioned in a recess defined by an inner peripheral surface of the socket part and an outer peripheral surface of the nose part, said second gasket has a heel end portion and has peripheral wing portions extending from the heel portion to abut between the socket and nose parts and define a V-shaped fluid pressure-sensitive chamber that is open towards the joint between the pipe members, and the socket part has a radial inward projection against which the heel portion of said second gasket abuts.

5. In a quickly-assembled latching collar coupling of the character described that connects a pair of fluid-carrying pipe members at their adjacent ends in a positively sealed joint relation under conditions wherein the pipe members carry a gaseous fluid under negative pressure and under minimum to high positive pressures, a socket part having a back cylindrical portion securely mounted about the end of one pipe member by rolled-in joint means, said socket part having a radially-outwardly projecting stop shoulder connecting the forward end of said cylindrical mounting portion through a cylindrical guide portion of intermediate diameter and a second radially-outwardly projecting shoulder to a cylindrical open-end socket portion of enlarged diameter, a reinforcing sleeve portion secured within said socket portion and terminating at its inner end in a longitudinally spaced relation with the second shoulder, said sleeve portion having flat crested internal threads longitudinally therealong of relative wide spacing, a reinforcing nose part secured about the end of the other pipe member by rolled-out joint means and projecting forwardly therealong to slidably fit within the cylindrical guide portion of said socket part and define a coupling joint therewith and having a forward edge face adapted to abut the stop shoulder of said socket part to limit a maximum inward insertion of the other pipe member within said socket part, the inner periphery of said socket part and the outer periphery of said nose part defining an operating spacing therebetween a resilient annular sealing gasket operatively positioned in a pocket defined by the second shoulder and by the cylindrical socket portion of said socket part backwardly of said reinforcing sleeve portion, said gasket having opposed inner and outer peripheral wing portions defining a V-shaped chamber facing toward the joint between the pipe members and having a heel portion positioned in abutment with a back edge face of said reinforcing sleeve portion, a coupling collar loosely carried about the other pipe member, said coupling collar having a forwardly-extending cylindrical portion provided with flat crested external threads of wide spacing to cooperatively engage with the internal threads of said reinforcing sleeve portion, said coupling collar having a radially-outwardly enlarged grip portion extending backwardly from said cylindrical portion for manually turning it forwardly into a locking position within said reinforcing sleeve portion, the grip portion of said coupling collar terminating backwardly in an inwardly-projecting stop flange, radially-projecting means on the other pipe member adapted to cooperate with said stop flange for limiting the maximum turned-in locking positioning of said coupling collar within said reinforcing sleeve portion, said coupling collar having a radially-inwardly turned front flange face at the forward end of its said cylindrical portion in an endwise opposed and spaced relationship with a back edge face of said nose part to define a gasket-receiving pocket therebetween and with said reinforcing sleeve portion and an outer peripheral wall portion of the other pipe member, said front flange face and said back edge face sloping radially-inwardly towards each other, a second resilient annular sealing gasket having a body of substantially rectangular section positioned within said second-mentioned pocket when said coupling collar has an initial turned-in position with respect to said reinforcing sleeve within said socket part, said second gasket having an inner diameter that is larger than the diameter of the outer peripheral wall portion of the other pipe member, said endwise opposed front and back faces being adapted to be moved into tight pressing-in engagement with localized opposed front and back side areas adjacent the radial inner periphery of said second gasket and the radial outer periphery of said second gasket being adapted to be moved into tight latching engagement with internal threads of said reinforcing sleeve portion when said coupling collar is turned within said reinforcing sleeve portion to its maximum locking position; a front side of said second gasket extending radially-outwardly beyond said front side area into the operating spacing, and said second gasket being of an elastically-radially distorted shape when said coupling collar is in its maximum in-turned locking poistion, with its radial outer periphery in elastic positive sealing mechanically-secure engagement with said reinforcing sleeve portion, with localized opposed side areas adjacent its inner periphery in elastic positive sealing abutment between said front and back faces, and with its radial inner periphery of a substantially V-shape that defines a chamber therein that is open between said coupling collar and the other pipe member to the atmosphere.

References Cited by the Examiner

UNITED STATES PATENTS

| | | | |
|---|---|---|---|
| 302,343 | 7/84 | Kitton | 285—356 |
| 1,460,208 | 6/23 | Mohn | 285—338 X |
| 2,364,447 | 12/44 | Hynes | 285—234 |
| 2,560,263 | 7/51 | Wiegand | 285—351 |
| 2,657,825 | 11/53 | Erickson | 285—113 X |
| 2,788,992 | 4/57 | DeVienne | 285—356 X |
| 2,916,306 | 12/59 | Rickard | 285—5 |

FOREIGN PATENTS

| | | |
|---|---|---|
| 1,223,575 | 2/60 | France. |
| 409,971 | 3/45 | Italy. |
| 39,673 | 12/36 | Netherlands. |

CARL W. TOMLIN, *Primary Examiner.*